United States Patent

Yamaguchi

[11] Patent Number: 6,135,378
[45] Date of Patent: *Oct. 24, 2000

[54] APPARATUS FOR REMOVING FILM FROM A FILM MAGAZINE

[75] Inventor: Takuji Yamaguchi, Nagagun, Japan

[73] Assignee: Noritsu Koki Co., Ltd., Wakayama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,476

[22] Filed: Mar. 24, 1997

Related U.S. Application Data

[63] Continuation of application No. 08/428,523, Apr. 21, 1995, abandoned.

[30] Foreign Application Priority Data

Apr. 25, 1994 [JP] Japan ..................................... 6-108987

[51] Int. Cl.⁷ ..................................................... G03B 23/02
[52] U.S. Cl. ................................... 242/348.1; 242/348.3; 242/348.4; 242/564.2; 396/661
[58] Field of Search .................................. 242/348, 348.1, 242/348.3, 550, 564, 564.2, 562, 348.4; 396/512, 661

[56] References Cited

U.S. PATENT DOCUMENTS

| | | | |
|---|---|---|---|
| 3,258,216 | 6/1966 | Wren | 242/564 |
| 5,439,186 | 8/1995 | Merle et al. | 242/348.1 |
| 5,465,920 | 11/1995 | Merle et al. | 242/348.1 |

*Primary Examiner*—John Q. Nguyen
*Attorney, Agent, or Firm*—Oblon, Spivak, McClelland, Maier & Neustadt, P.C.

[57] ABSTRACT

A simple and compact apparatus for removing film from a film magazine includes a film slot opening/closing mechanism which is operated by a film slot opening/closing lever, and a spool driving shaft which is turned by a spool revolving knob. The apparatus further includes a film releasing mechanism. The mechanism has a structure such that a film releasing jig is inserted into a cartridge loaded with a film magazine through the film outlet slot of the cartridge by operating a film releasing jig lever.. The apparatus is used with a film magazine whose spool shaft has a film engagement claw therein. A hole formed in the tail end of film is engaged with the engagement claw. When the film releasing jig is inserted into the cartridge, the film is disengaged from the engagement claw. The film slot opening/closing lever, spool revolving knob, and film releasing jig lever are operated manually.

1 Claim, 10 Drawing Sheets

(PRIOR ART)

APPARATUS FOR REMOVING FILM FROM A FILM MAGAZINE

This application is a continuation of application Ser. No. 08/428,523, filed on Apr. 21, 1995, now abandoned.

BACKGROUND OF THE INVENTION

1. Field of the Invention

The present invention relates to an apparatus for removing film from a film magazine by disengaging the film from a film engagement claw provided on a spool of the film magazine.

2. Description of the Related Art

Conventionally, photographic film is wound on a spool in a film magazine. The film is engaged with the spool through the engagement between a hole formed in the tail end of the film and a claw or hook provided on the spool. This ensures proper feeding of the film when the film magazine is placed in a camera for taking pictures. To remove the film from the film magazine for development, the film needs to be released from the spool.

Each film magazine is provided with a mechanism for feeding out the leading end of the film. As the spool is turned in a film unwinding direction, the leading end of the film comes out of a film slot of the film magazine. The film is then taken up into a light-shielded magazine in a dark box. In order to release the film from the spool, an operator breaks the film magazine and disengages the hole formed in the tail end of the film from the engagement claw of the spool, or cuts the film near the tail end thereof which is fixed to the spool of the film magazine.

Various apparatuses have been proposed which automatically take up film utilizing a film magazine which has a film engaging means from which the film is easily disengaged. Examples of such apparatus will be described below.

Japanese Patent Application Laid-open No. 5-232633 entitled "Film Unwinding Apparatus" discloses a film magazine in which hooks project from the body of a spool in the film winding direction. Film is wound on the spool with a hole in the tail end of the film engaged with hooks. The operation of the film unwinding apparatus will now be described with reference to FIG. 1 (PRIOR ART) and FIG. 2 (PRIOR ART).

Figure 1:
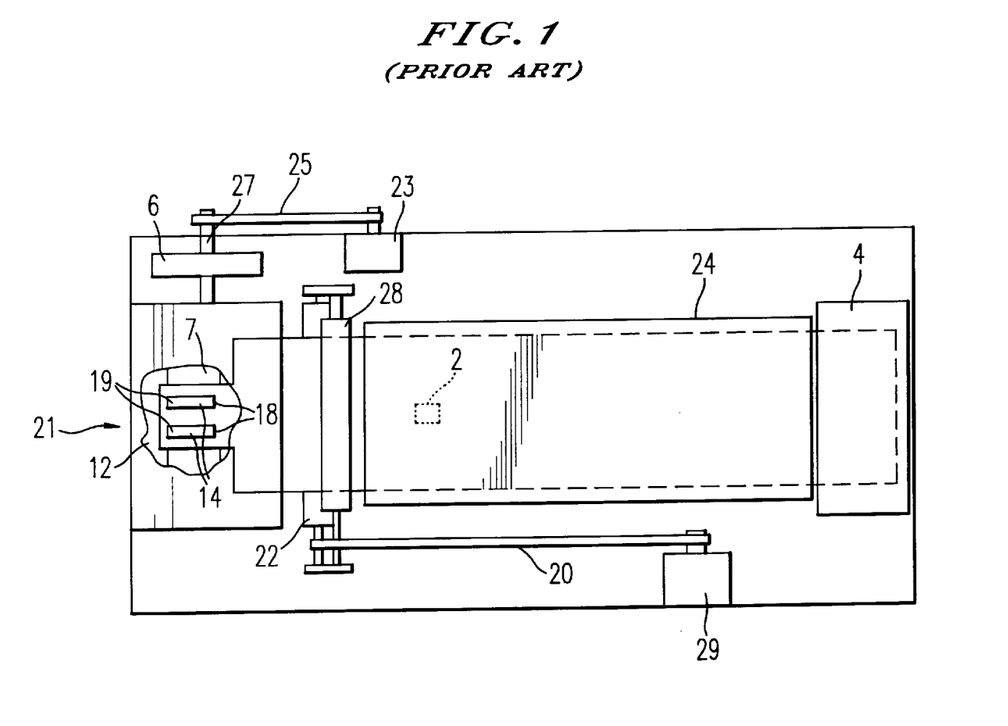
FIG. 1 (PRIOR ART) is a top view showing a conventional film take-up apparatus.
Figure 2:
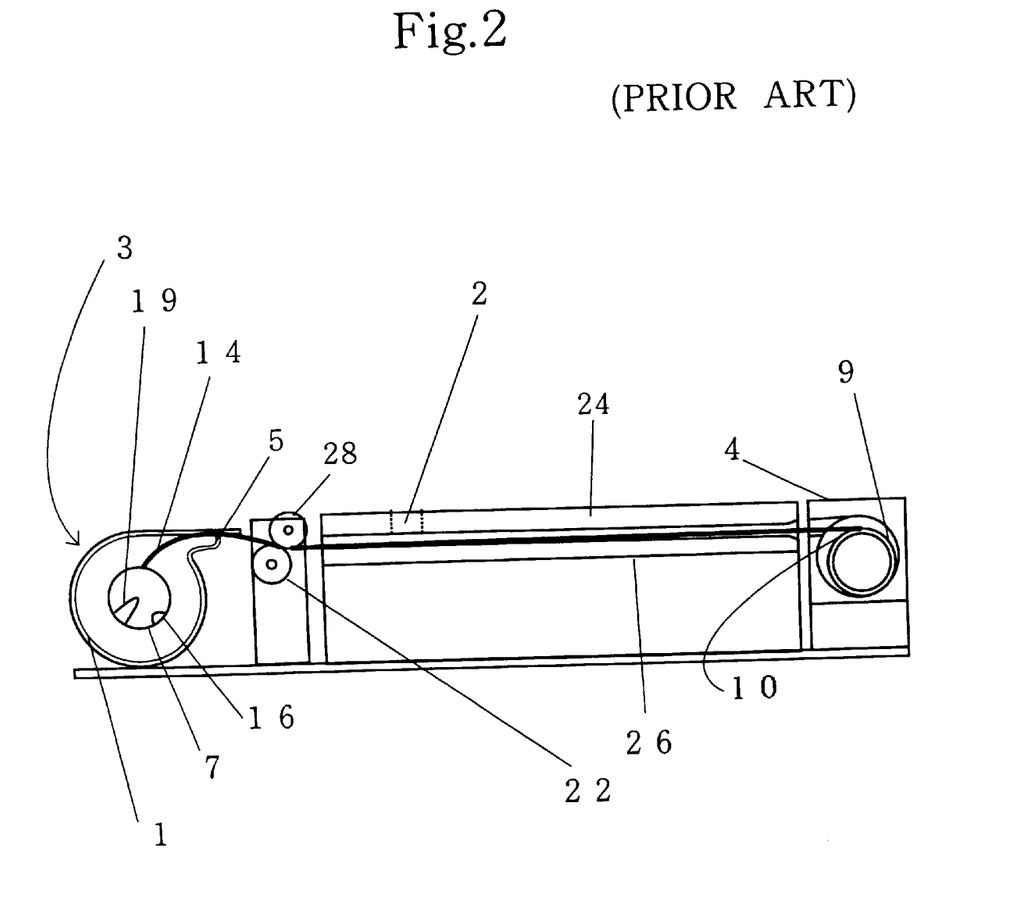
FIG. 2 (PRIOR ART) is a cross-sectional view of the conventional film take-up apparatus shown in FIG. 1 (PRIOR ART)

FIG. 1 (PRIOR ART) is a top view showing a conventional film take-up apparatus in which the above-described film unwinding apparatus is used, and FIG. 2 (PRIOR ART) is a cross-sectional view of the film take-up apparatus. A film unwinding apparatus 21 has a spool driving motor 23 which drives a spool driving shaft 27 through a belt 25, a roller driving motor 29 which drives a film driving roller 22 through a belt 20, and film guide tracks 24, 26. A pressure roller 28 is brought into contact with the film driving roller 22 by a spring force. A flywheel 6 is mounted on the spool driving shaft 27.

A film magazine 1 is set such that a spool core 7 is coaxial with the spool driving shaft 27, and a light-shielding tongue 5 is opened. When the roller driving motor 29 and the spool driving motor 23 are energized, the film driving roller 22 revolving at a high speed and the spool core 7 revolving at a low speed in an unwinding direction cause the leader portion 9 of the film to come out of a cassette shell 3.

A leading end 10 of the film is fed between the film driving roller 22 and the pressure roller 28 and between the film guide tracks 24, 26. When a film sensor 2 detects the leading end 10, the spool driving motor 23 is turned off. The roller driving motor 29 continues revolving the film driving roller 22 to feed the film into a portable collector bin 4. This causes the spool core 7 and the spool driving shaft 27 with the flywheel 6 to revolve. When the tail end of the film is reached, the inertia of the flywheel 6 causes the spool core to keep revolving, thereby disengaging long hooks from holes 14 formed in the tail end 12 of the film. The film driving roller 22 pulls out the tail end 12 to thereby remove the film from the cassette shell 3.

Japanese Patent Application Laid-open No. 4-122925 entitled "Photographic Film Magazine" discloses a film magazine having a spool provided with a movable claw with which a hole in the tail end of film is engageable. A claw moving member is provided in an interlocking relation with the movable claw. The claw moving member is operated using a tool or directly by hand. Alternatively, a jig or the like is inserted inside the film magazine through a film slot, thereby disengaging the claw of the spool from the hole formed in the tail end of the film. Such a film magazine is used together with a film take-up apparatus which is provided with a mechanism for operating the claw moving member or which is provided with a jig for releasing film and a mechanism for inserting the jig into the film magazine.

In the case where a claw moving member is provided outside a film magazine near a spool core, the claw moving member is operated using a movable shaft, or directly operated without using a tool or jig. In the case where a claw moving member is provided inside a spool shaft, the claw moving member is operated by inserting a sheet-like tool or jig into a film magazine. Also disclosed is a film magazine in which a claw moving member is integrally formed with a movable claw. In this case, a jig is inserted into a film magazine to directly disengage film from the claw.

Figure 3:
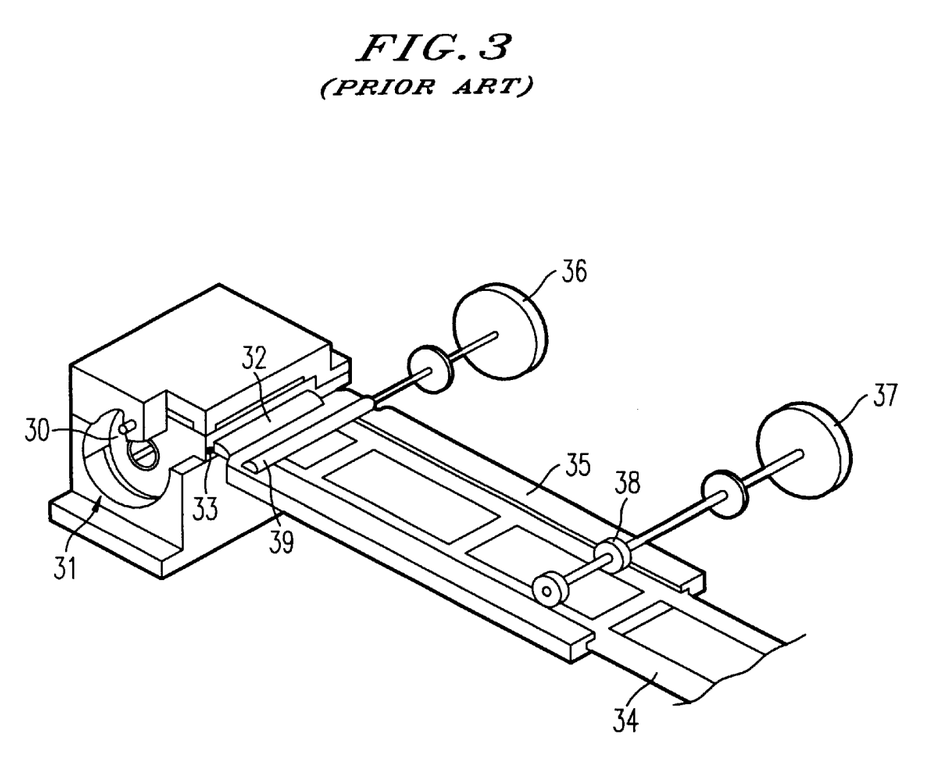
FIG. 3 (PRIOR ART) is a perspective schematic view showing another conventional film take-up apparatus.

FIG. 3 (PRIOR ART) is a perspective schematic view showing an example of such a conventional film take-up apparatus. In the film take-up apparatus, a film magazine 30 is placed in a film magazine case 31, and then a jig 32 is inserted into a film slot 33. The jig 32 comprises two sheet-like elastic members between which photographic film 34 passes and has a cut-out portion for disengaging an engagement hole from an engagement claw. As a spool is revolved in a film unwinding direction, the leading end of the film comes out from the film slot 33 while being guided by the jig 32.

A driving motor 36 is turned on to rotate a film transport driving roll 39 to thereby transport the leading end of the film from the film slot 33 to a film transport track 35. Furthermore, a driving motor 37 is turned on to rotate a film transport driving roll 38 to thereby advance the film. Finally, the jig 32 is inserted to the position of the engagement claw of the spool to release the film 34 from the claw, thus freeing the film 34 from the spool. This allows the film 34 to be unwound as far as its tail end.

As has been described above, film is taken up either manually or using a film take-up apparatus. The manual method is simpler, but requires a film magazine to be broken or film to be cut away in order to free the film from a film engagement claw.

A film magazine is sturdy, and its components are tightly joined together to shut off light. As a result, it is difficult to break the film magazine. In the case of cutting film, because of the tail end of the film being left in a film magazine, it is difficult to reuse the film magazine, as in the case of breaking the film magazine. Also, it is difficult to rewind the film with its tail end cut off back into a film magazine because the film has lost a hole formed in the tail end of the film.

On the other hand, the film take-up apparatuses disclosed in Japanese Patent Application Laid-open Nos. 5-232633 entitled "Film Unwinding Apparatus" and 4-122925 entitled "Photographic Film Cassette" allow the tail end of film to be easily freed from a film engagement claw of a spool for film take-up without cutting the film or breaking a film magazine.

However, due to a complex structure including a plurality of motors for rotating a spool and for transporting film, a film releasing jig, a jig driving unit and the like, the apparatuses become large.

Also, large apparatuses with a complex structure involve higher costs and rather complicated operation and maintenance. Such film take-up apparatuses are suitable for use in large-scale processing laboratories but are not suitable for use in small-scale processing laboratories or for personal processing use. Cutting film or breaking a film magazine is still in popular use.

SUMMARY OF THE INVENTION

An object of the present invention is to provide a compact and simple apparatus which can remove film from a film magazine in an easier manner and which allows the film magazine to be reused.

According to the present invention, there is provided an apparatus for removing film from a film magazine in which a hole formed in a tail end of the film is engaged with an engagement claw provided on a spool of the film magazine. The apparatus includes a cartridge in which a film magazine is placed, a mechanism having a knob and mechanically engageable with a core portion of the spool for rotating the spool in accordance with rotation of the knob, a film outlet slot which is formed in the cartridge and through which film unwound from the film magazine comes out, a film guide for leading the film unwound from the film magazine to the film outlet slot, a mechanism having a first lever and adapted to open and close a film slot of the film magazine in accordance with operation of the first lever, and a film releasing jig formed of a sheet-like elastic material and adapted to slide upon operation of a second lever so that the jig enters the film magazine through the film slot, thereby disengaging the hole formed in the tail end of the film from the engagement claw.

In the apparatus for removing film according to the present invention, film can be released from a film magazine by a simple mechanism provided in the cartridge in which the film magazine is placed. Accordingly, the apparatus of the present invention has fewer components, it enables a user to open and close a film slot, rotate a spool, and insert a film releasing jig, all manually, and it is light and portable. The apparatus is therefore easy to handle.

In the film removing apparatus of the present invention, it is unnecessary to break a film magazine or leave a piece of film within the film magazine. The film magazine can therefore be reused. When an empty film magazine is to be reused, negative film can be rewound into the empty film magazine using the apparatus of the invention.

BRIEF DESCRIPTION OF THE DRAWINGS

Various other objects, features and many of the attendant advantages of the present invention will be readily appreciated as the same becomes better understood by referring to the following detailed description of the preferred embodiment when considered in connection with the accompanying drawings, in which.

DETAILED DESCRIPTION OF THE PREFERRED EMBODIMENT

The present invention will now be described in more detail with reference to the drawings.

Figure 4:
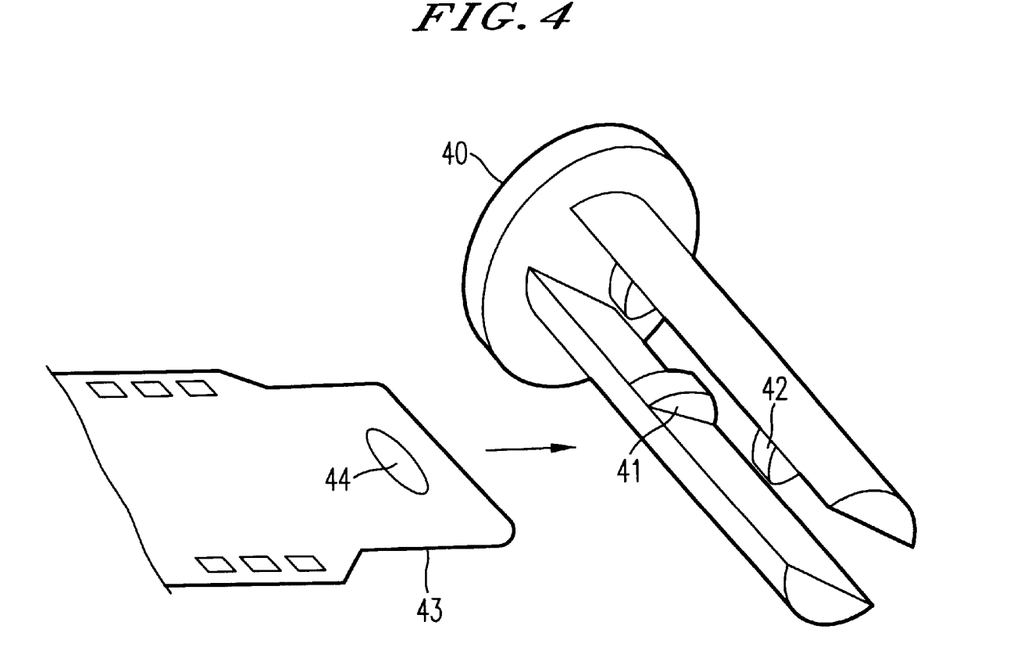
FIGS. 4 and 5 are views illustrating an example of a film engagement claw provided on a spool of a film magazine for use with a film removing apparatus according to the present invention.
Figure 5:
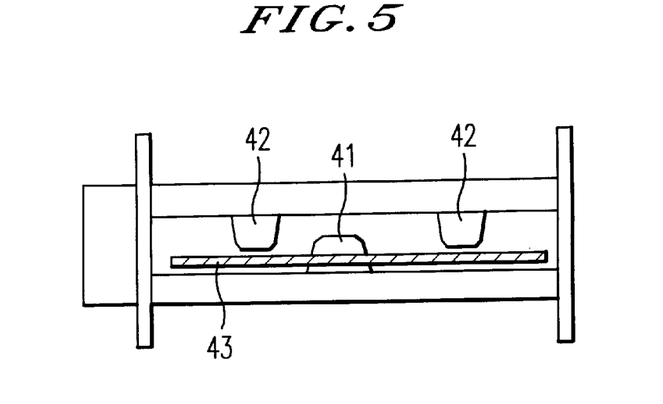

A film magazine for use with a film removing apparatus of the present invention has a film engagement claw in a spool shaft to which a hole formed in the tail end of film is hooked. FIGS. 4 and 5 are views illustrating an example of the film engagement claw provided in the spool shaft of the film magazine. A spool 40 has a shaft split into two parts. One has an engagement claw 41 for engagement with a hole formed in the tail end of film, and the other has retaining projections 42 to prevent the engaged film from coming off the engagement claw 41. The illustrated example has one engagement claw and two retaining projections.

When film 43 is wound into a film magazine, the film 43 is inserted into the split shaft of the spool 40 to pass over the engagement claw 41. Then, the film 43 is pulled to engage a hole 44 formed in the tail end of the film 43 with the engagement claw 41. The engagement claw 41 has a slight curve on the side which faces an incoming film and generally projects inward for engagement with the film 43. The retaining projections 42 abut on the film 43 at a curved surface thereof in order to lightly press the film 43, thereby preventing the engaged film 43 from being released.

Figure 6:
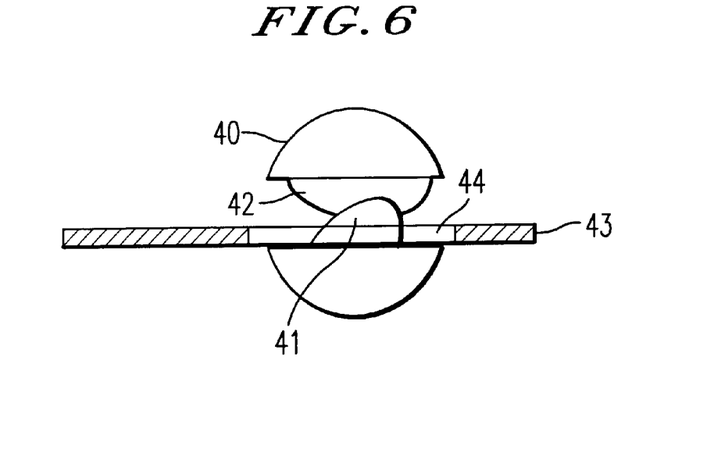
FIGS. 6–8 are views illustrating an operation for releasing film from a film engagement claw provided on a spool of a film magazine for use with the film removing apparatus.
Figure 7:
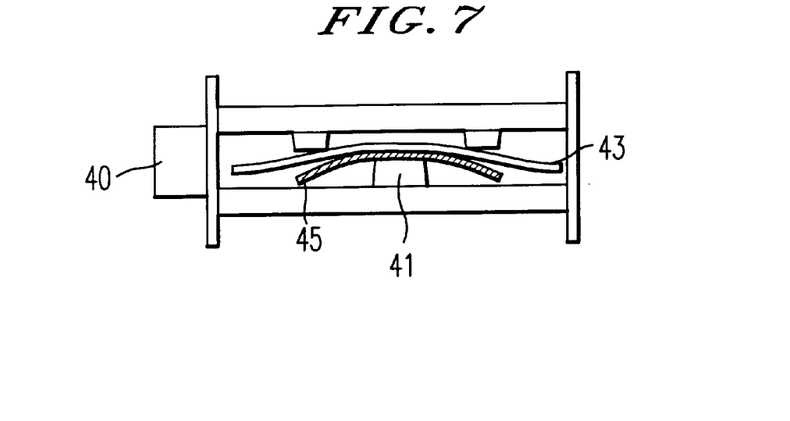
Figure 8:
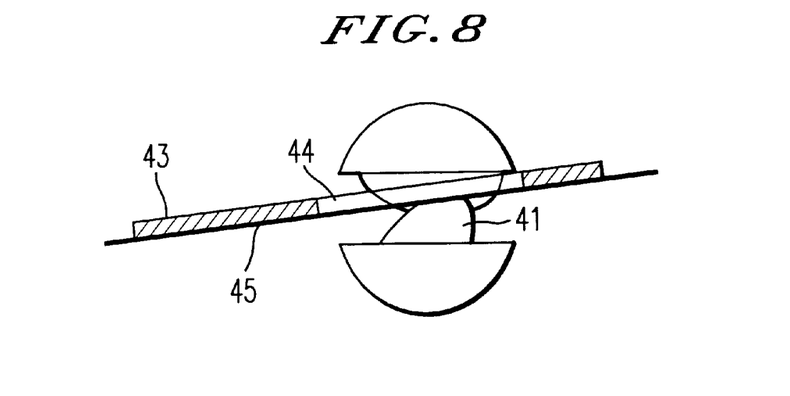

FIGS. 6–8 are views illustrating how to release film from the film engagement claw 41 provided on the spool 40 of the film magazine to be used with the film removing apparatus of the present invention. When the film 43 is unwound from the film magazine, the film 43 keeps running until the state shown in FIG. 6 is reached. In the state of FIG. 6, the hole 44 formed in the tail end of the film 43 and extending toward a film slot is still engaged with the engagement claw 41. As a film releasing jig 45 formed of a sheet-like elastic material is inserted along the bottom surface of the film 43 and along the surface of the engagement claw 41, the film releasing jig 45 advances between the hole 44 in the tail end of the film 43 and the engagement claw 41, as shown in FIGS. 7 and 8, thereby disengaging the tail end. Thus, the film 43 can be pulled out from the film magazine.

Figure 9:
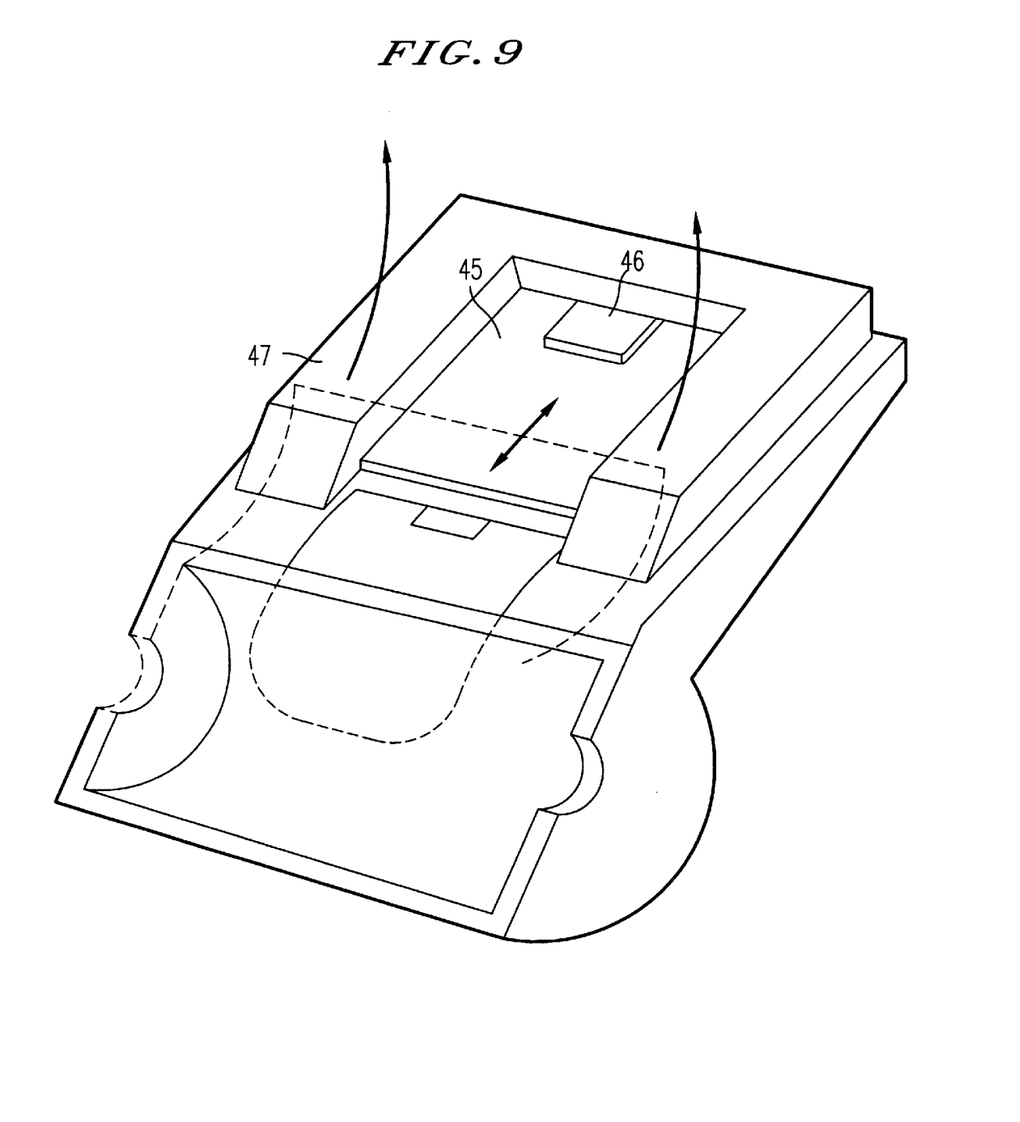
FIG. 9 is a partially removed perspective view of a film removing apparatus according to the present invention which shows a mechanism for removing film.

FIG. 9 is a view illustrating a mechanism for removing film using the above-described film releasing jig 45. The film releasing jig 45 formed of a sheet-like elastic material has a film releasing jig lever (shown in FIGS. 10, 11, 12 and 14) attached to a bottom face thereof and a stopper 46 attached to a top face thereof. The film releasing jig 45 is inserted into a film magazine until the stopper 46 comes in contact with a film slot. A film guide 47 located on both sides of the film releasing jig 45 has a slant at the side facing the film slot to lead the film 43 coming out from the film magazine obliquely upward and provides a path for the film releasing jig in order to lead it into the film magazine.

Figure 10:
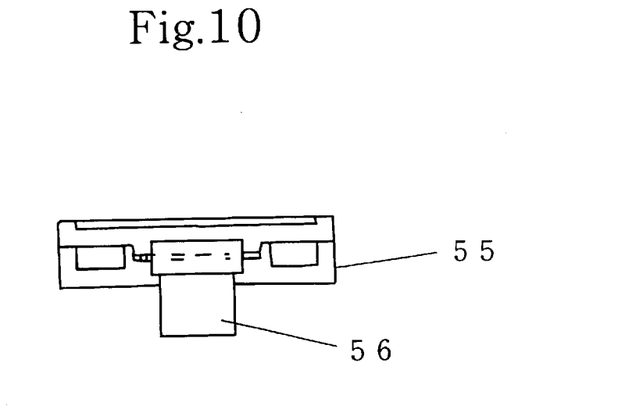
FIG. 10 is a front view of the film removing apparatus shown in 9.
Figure 11:
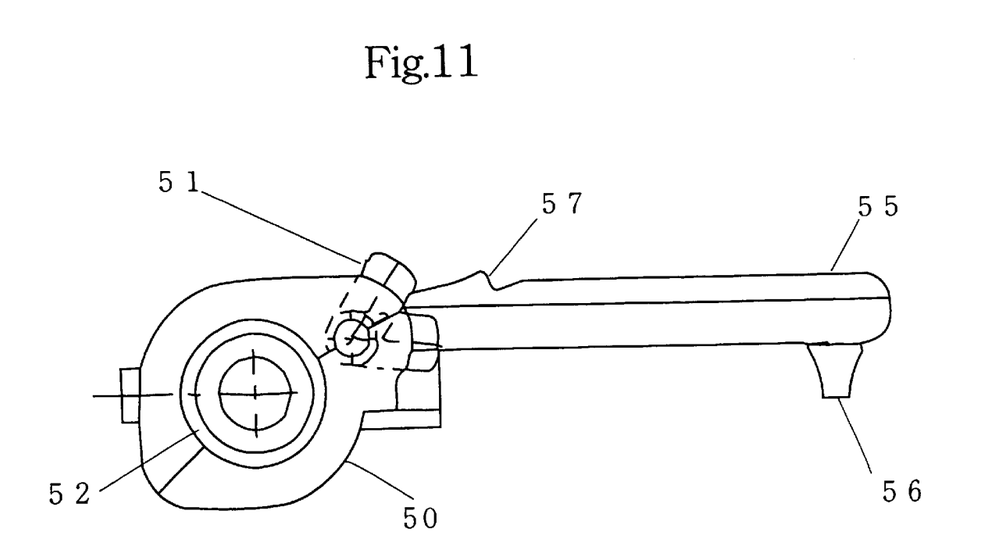
FIG. 11 is a side view of the film removing apparatus shown in FIG. 9.
Figure 12:
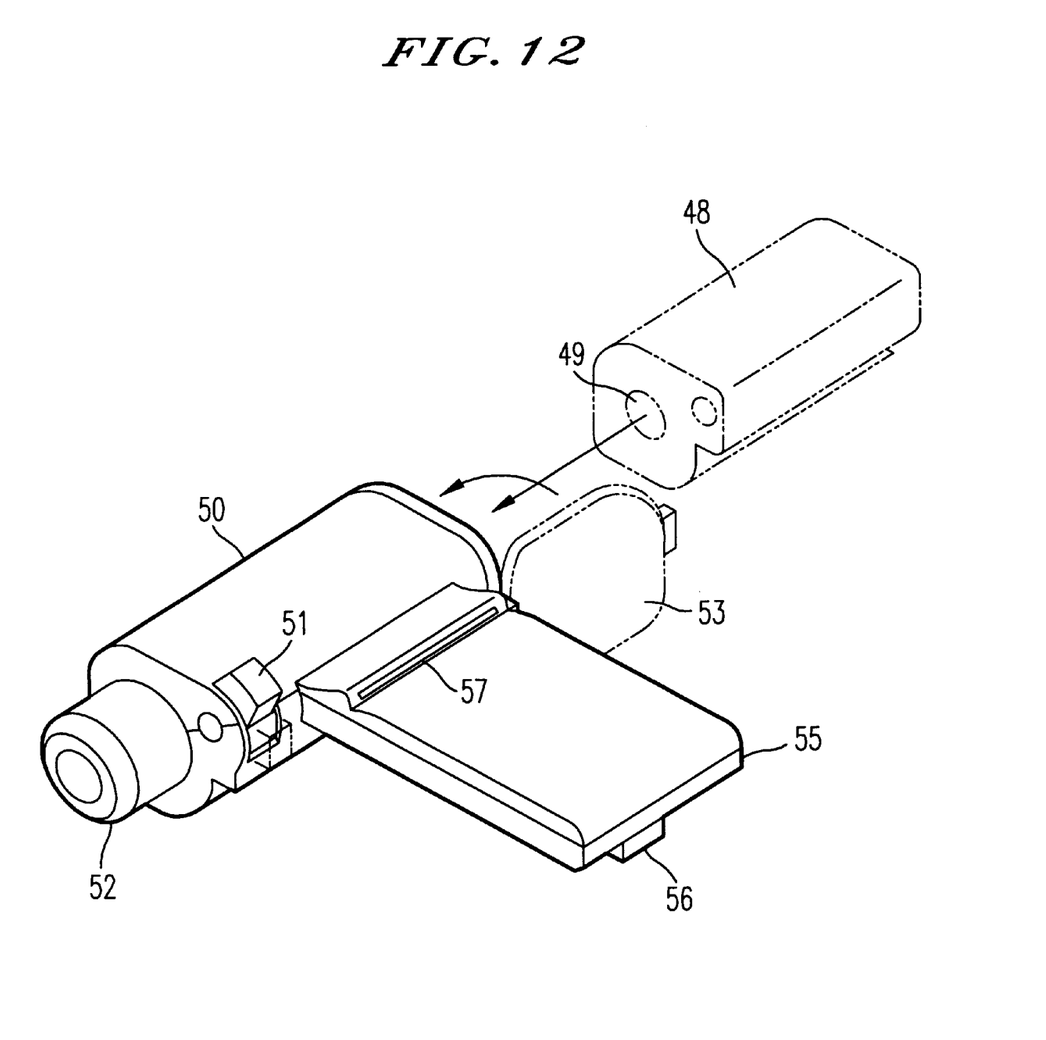
FIG. 12 is a perspective view of the film removing apparatus shown in FIG. 9.

FIGS. 10–12 are external views showing the film removing apparatus shown in FIG. 9. FIG. 10 is a front view, FIG. 11 is a side view, and FIG. 12 is a perspective view. A cartridge 50 has, at one of its sides, a spool revolving knob 52 which is integrally formed with a spool driving shaft to fit into a spool core 49 of a film magazine 48 loaded in the cartridge 50. When the spool revolving knob 52 is rotated, the spool of the film magazine 48 loaded in the cartridge 50 is rotated accordingly.

The cartridge 50 has, at the other side thereof, a cover 53 which is opened and closed to load a film magazine 48 into or unload the film magazine 48 from the cartridge 50. When a film slot opening/closing lever 51 is thrown, a film slot of the film magazine 48 within the cartridge 50 opens.

A film removing mechanism 55 has a film outlet slot 57 and contains a film releasing jig. One end of the film releasing jig is fixed to a film releasing jig lever 56. When the film releasing jig lever 56 is slid toward the cartridge 50, the film releasing jig is inserted into the film magazine 48 through a film slot to free the film 43 from the engagement claw of a spool.

The film removing apparatus of the present invention is used in the following manner. The spool revolving knob 52 is rotated to cause the leading end of the film 43 to come out of the film outlet slot 57 of the film removing mechanism 55. Then, the film 43 is manually pulled out until it will not come out any further. Finally, the film releasing jig lever 56 is slid to separate the film 43 from the film magazine 48. When an undeveloped film is to be handled, the film removing apparatus of the present invention is used in a dark box.

Figure 13:
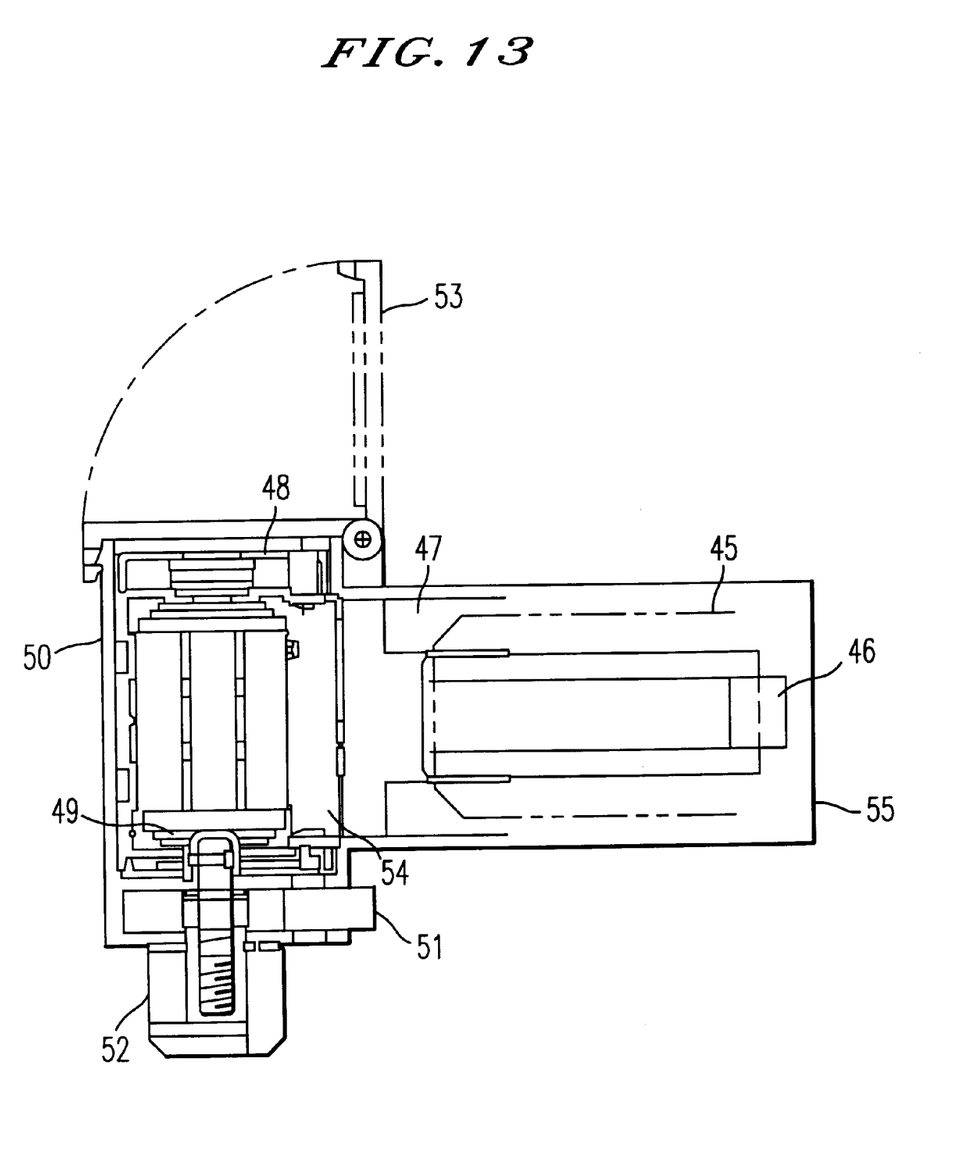
FIG. 13 is a sectional top view of the film removing apparatus shown in FIG. 9.
Figure 14:
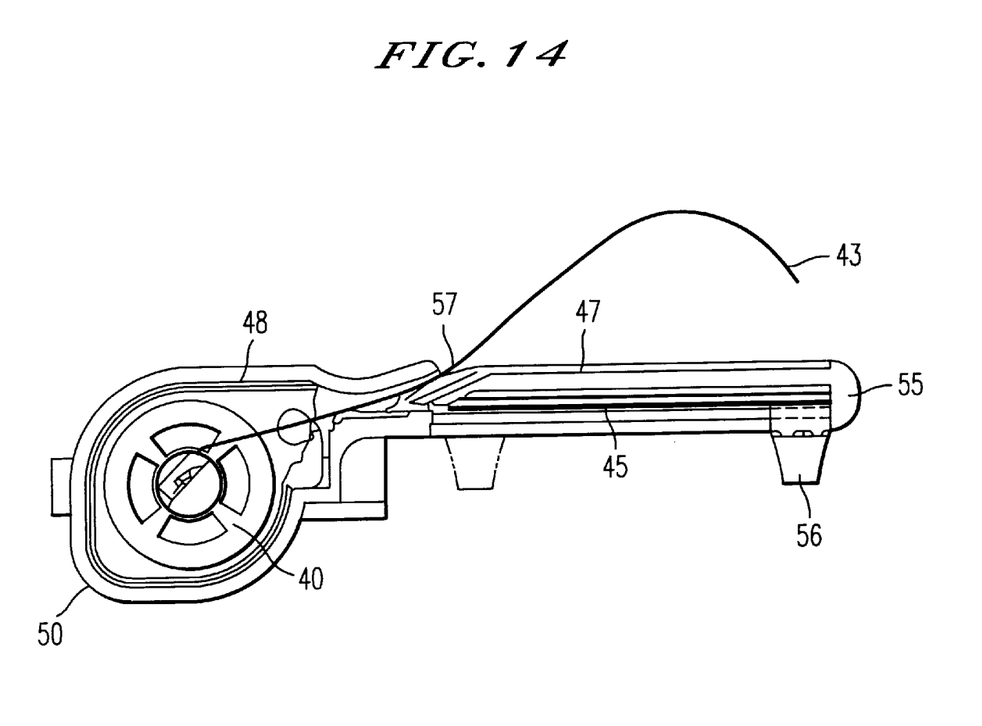
FIG. 14 is a cross-sectional view of the film removing apparatus shown in FIG. 9.

The operation of the film removing apparatus will now be described with reference to FIGS. 13 and 14. FIG. 13 is a sectional top view of the film removing apparatus while FIG. 14 is a cross-sectional view of the film removing apparatus.

As described above, the film magazine 48 has a mechanism designed to cause the leading end of film 43 to come out of the film magazine 48 when the spool 40 is rotated in a film unwinding direction. The film magazine 48 is loaded into the cartridge 50 in a direction such that the spool core 49 fits in the spool driving shaft, and then the cover 53 is closed. When the film slot opening/closing lever 51 is thrown, the film slot 54 is opened.

When the spool revolving knob 52 is turned to rotate the spool 40 in a film unwinding direction, the film 43 coming out from the film slot 54 is led obliquely upward along the film guide 47 and projects from the film outlet slot 57. The film 43 projecting from the film outlet slot 57 is manually pulled out until it will not come out further. The film releasing jig lever 56 is slid to the position indicated by a dashed line in FIG. 14, where the stopper 46 prevents the lever 56 from sliding further. This causes the film releasing jig 45 to be inserted through the film slot 54 and to free the film 43 from an engagement claw of the spool. The film 43 is manually pulled out entirely from the film magazine 48 to complete the film removing operation.

The film removing apparatus of the present invention has fewer component parts and a simple structure and is easy to handle. The apparatus is about as large as a film magazine combined with the film removing jig. It, therefore, can be handled in one hand.

Obviously, numerous modifications and variations of the present invention are possible in light of the above teachings. It is therefore to be understood that within the scope of the appended claims, the present invention may be practiced other than as specifically described herein.

What is claimed is:

1. A portable, hand-held apparatus which is manually operable by a single operator for manually removing film from a film magazine in the dark, the film magazine being equipped with a film slot opening/closing mechanism, said apparatus comprising:

a cartridge for receiving the film magazine therein;

a manually operated rotatable knob mounted at one end of said cartridge and which is engageable with a spool core of the film magazine to rotate the spool core;

a manually operated film slot opening/closing lever mounted on a side of said cartridge and which opens a film slot of the film magazine;

a film removing mechanism mounted on said side of said cartridge and extending radially therefrom, said film removing mechanism having a film guide in an upper portion thereof and a manually operated film release lever slidably mounted on a lower surface thereof;

said film guide guiding film which comes out of a film slot when the film is unwound as the rotatable knob is rotated;

a film release member disposed in the film removing mechanism to be slidable along a direction substantially identical to a direction of slide movement of the film release lever and connected directly to said film release lever, said film release member being constructed of a resilient, thin plate, said film release member being inserted into the opened film slot when said film release lever is slidably moved in order to remove the film from a film engagement claw of the spool core of the film magazine so that an end of the film is no longer engaged with the spool core;

said film slot opening/closing lever, said rotatable knob and said film release lever being adapted to be handled in one hand of said operator, wherein said film guide has a slant in the vicinity of the film slot and leads the film obliquely upward and provides a path for enabling insertion of said release member into the opened film slot.

* * * * *